May 31, 1960  L. E. FOGARTY  2,938,682
METHOD AND MEANS FOR FOCUSING SOUND CAUSED BY AIRCRAFT
Filed Sept. 17, 1954  2 Sheets-Sheet 1
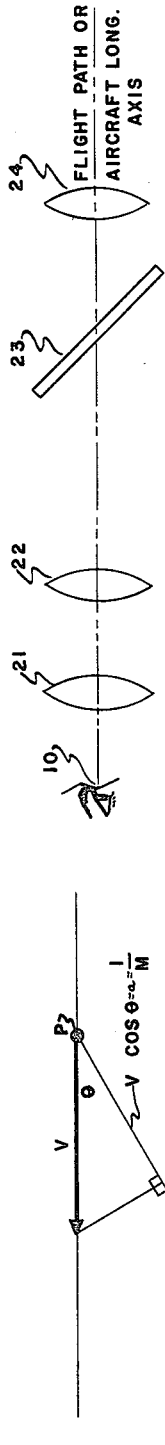
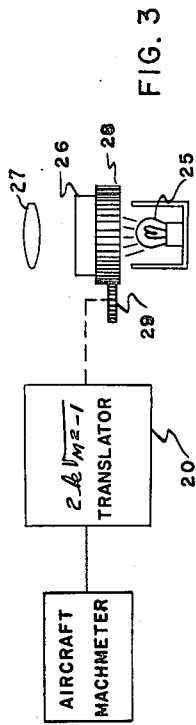
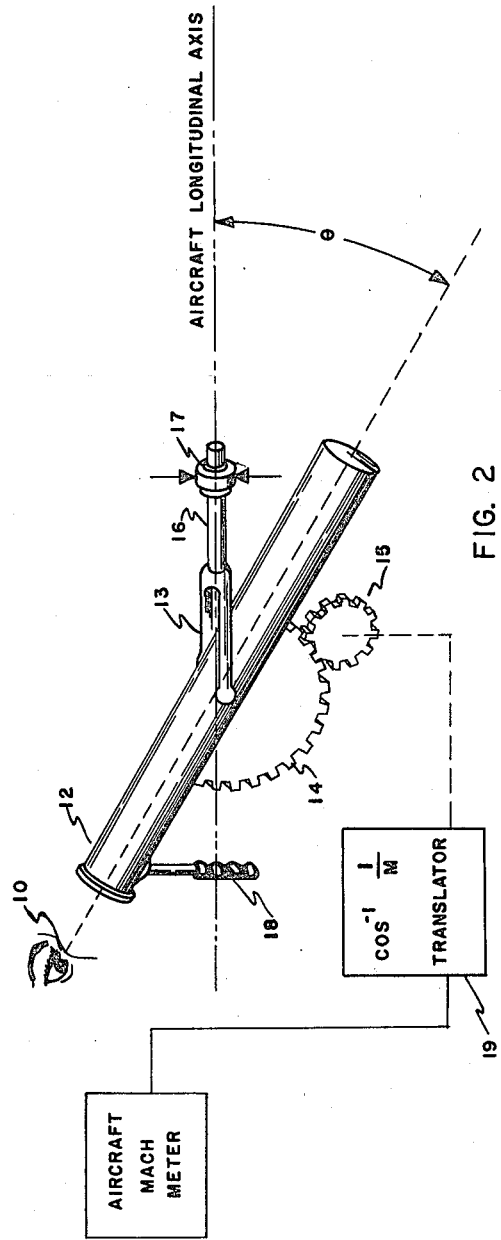
LAURENCE E. FOGARTY
INVENTOR
BY
ATTORNEY May 31, 1960     L. E. FOGARTY     2,938,682
METHOD AND MEANS FOR FOCUSING SOUND CAUSED BY AIRCRAFT
Filed Sept. 17, 1954     2 Sheets-Sheet 2
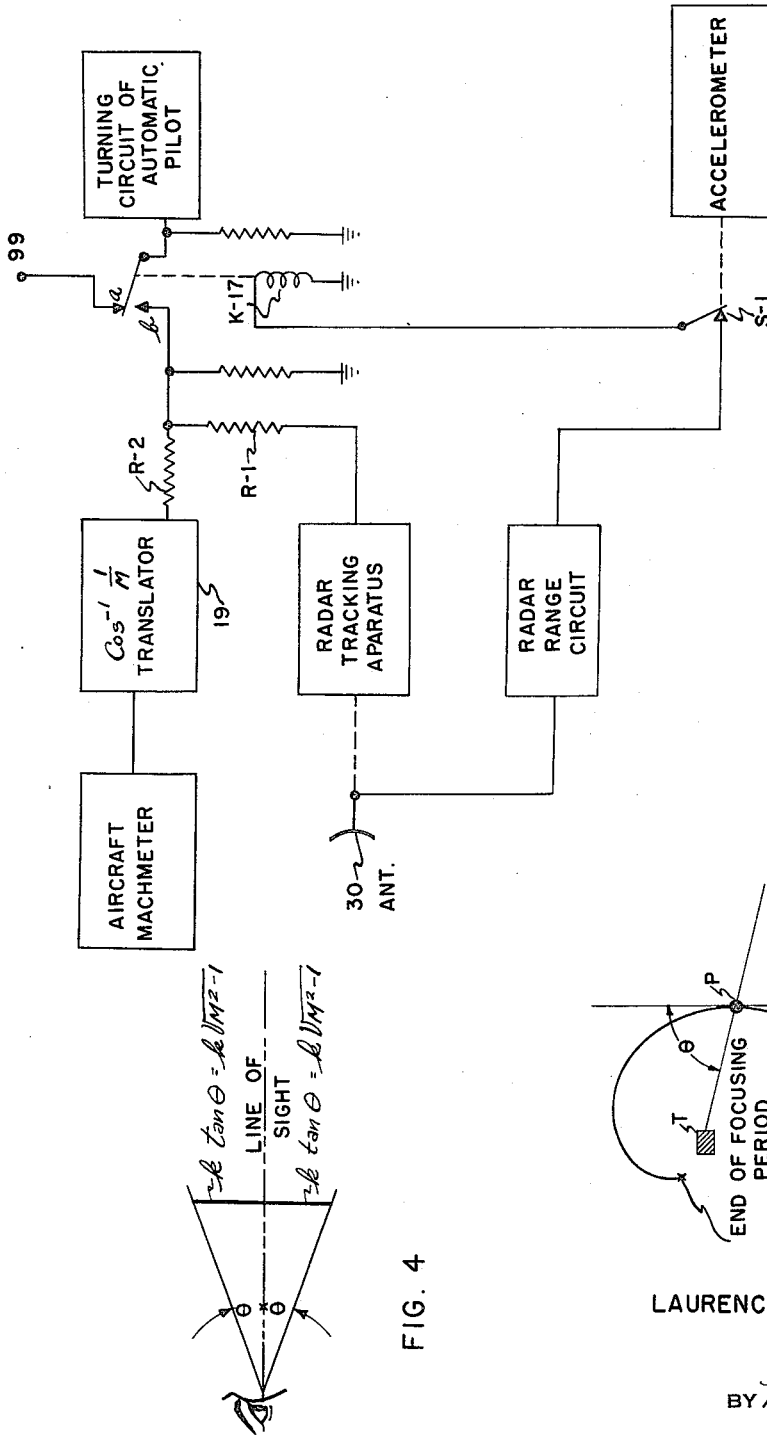
LAURENCE E. FOGARTY
INVENTOR
BY
ATTORNEY 2,938,682

METHOD AND MEANS FOR FOCUSING SOUND CAUSED BY AIRCRAFT

Laurence E. Fogarty, Binghamton, N.Y., assignor to General Precision, Inc., a corporation of Delaware Filed Sept. 17, 1954, Ser. No. 456,786

8 Claims. (Cl. 244—77)

My invention relates to a method and means for projecting energy disturbances caused by passage of an airborne object at supersonic speed through a fluid medium to a predetermined point, and in particular to method and means for creating intense disturbances at a target point for offensive purposes. When an object passes through a fluid medium at a speed which is equal to or greater than the critical speed, or speed of wave propagation in the medium, such object creates a pressure disturbance manifested in shock waves. Early test flights of aircraft capable of flight at sonic or supersonic speeds during dives caused considerable disturbance and some property damage until sonic dives near populated areas were prohibited. My invention describes method and means for greatly intensifying or concentrating such disturbances at a predetermined target point or area, so that no major damage to property and morale may be accomplished.

It is therefore a primary object of my invention to provide a method for concentrating or intensifying to a remote point energy disturbances caused by passage of an object through a fluid medium.

It is another object of my invention to provide a method and means for concentrating or intensifying sound created by passage of an aircraft at sonic or supersonic velocity through the air to a remote target point.

It is a further object of the invention to provide means by which the pilot of an aircraft may determine the correct flight path at sonic or supersonic speeds in order to concentrate or intensify energy disturbances to a remote point or area.

It is yet another object of the invention to provide means by which a pilotless missile may be automatically guided so as to concentrate or intensify energy disturbances caused by sonic or supersonic flight to a remote target point.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

Fig. 1 is a velocity diagram of an aircraft traveling at supersonic speed in relation to a target point;

Fig. 2 is a schematic diagram of an assembly by means of which the pilot of an aircraft may sight a target point in order to focus or concentrate sound waves to the target point.

Fig. 3 shows schematically an alternative improved sight;

Fig. 4 is a geometric diagram useful in understanding the operation of the apparatus of Fig. 3;

Fig. 5 is a plan view of a typical flight path;

Fig. 6 is a schematic diagram of a guidance system by means of which a pilotless missile may be caused to fly the correct flight path so as to concentrate sound waves generated by sonic or supersonic flight to a remote point. In Figs. 2, 3 and 5 certain conventional parts are shown in block diagram form for sake of clarity.

Assume that an aircraft is travelling at sonic or supersonic speed in a stationary isothermal atmosphere. Travel at supersonic speed in a straight line generates a cone-shaped envelope of waves which is denominated the shock front. Assuming that the dimensions of the aircraft are small compared with the distances travelled, a shock wave may be considered to be a sound wave of great intensity which decreases in intensity as its distance from the source increases, so that the sound waves generated may be considered as emanating from a moving point. At each instant, the waves generated by the moving point will decay to sound waves of decreasing intensity as they travel in all directions from the point at the speed of sound. I have discovered that if the sound waves generated during a finite length of time are caused to arrive simultaneously at a target point, a very intense disturbance will be created at the target point. To make such waves arrive simultaneously at the target point it has been found necessary that the aircraft move toward the target point at the speed of sound. If the speed of the aircraft is greater than the speed of sound, it is necessary that the component of aircraft speed in the direction of the target equal the speed of sound.

Referring to Fig. 1 there is shown an aircraft P travelling at velocity V. If the desired target T is in a plane parallel to the plane of aircraft travel, it may be seen that the component of aircraft velocity towards the target T will equal $V \cos \theta$.

Since such component must equal the speed of sound "$a$" for proper concentration of the shock waves:

$$V \cos \theta = a$$

$$\text{Since } a = \frac{V}{M}$$

where $M$ equals Mach Number, $$V \cos \theta = \frac{V}{M}$$

$$\cos \theta = \frac{1}{M}$$

$$\theta = \text{arc } \cos \frac{1}{M}$$

Hence it may be seen that the angle between the aircraft flight path and target must be maintained at $$\text{arc } \cos \frac{1}{M}$$

and that as long as such an angle is maintained, sound waves generated throughout a finite length of time will converge on the target point at a particular instant.

Referring to Fig. 2 there is shown schematically an apparatus by which the pilot of a high speed aircraft may be enabled to fly the proper flight path so as to concentrate the sound waves generated to a target point. Located directly forward of the pilot's station and accessible to the eye 10 of the pilot is a telescope 12 having conventional lenses. Telescope 12 is pivotally mounted in yoke 13. Gear sector 14 is rigidly attached to telescope 12 and pinion 15 meshes with gear sector 14 to rotate telescope 12 through the angle $\theta$. The shaft end portion 16 of yoke 13 is mounted along the longitudinal axis of the aircraft in bearing 17. Handle 18 is rigidly attached to telescope 12 to allow manual rotation of the assembly around shaft 16. At sonic and supersonic speeds the angle of attack of most aircraft is very small (less than one degree), and hence the longitudinal axis of the aircraft may be considered to correspond to the aircraft flight path. In alternative embodiments of the invention, the pivot point of telescope 12 may be located on the actual flight path by positioning shaft 16 relative to the aircraft longitudinal axis in accordance with instantaneous angle of attack. For example, shaft 16 may be servo-slaved to a vane on the nose of the aircraft.

Pinion 15 is rotated by the output of a $$\cos^{-1}\frac{1}{M}$$

translator 19. Translator 19 may take a variety of forms, all of which serve to translate the input quantity Mach number M to $$\cos^{-1}\frac{1}{M}$$

rotary position. For example, translator 19 may consist of an arc-cosine cam and follower adapted to position a linear servomechanism. As another example, translator 19 may consist of a conventional electric servomechanism having an arc-cosine follow-up potentiometer wound non-linearly to provide $$\cos^{-1}\frac{1}{M}$$

modification of the Mach number input quantity. Many modern high speed aircraft carry "machmeters," and the invention contemplates derivation of the input signal for translator 19 from the same apparatus presently utilized to actuate a "machmeter." Machmeters commonly comprise assemblies similar to airspeed measuring apparatus together with mechanical computing linkages to actuate the machmeter pointer. It will be apparent that the machmeter pointer shaft position may be used to position a cam or an electrical or hydraulic servo as mentioned above. It is desirable that power amplifying means be incorporated in the translators utilized.

As an aircraft traveling at supersonic speed follows the correct flight path for concentrating sonic disturbances toward a target point, the aircraft will be traveling toward the target point in a spiral defined by a $$\cos^{-1}\frac{1}{M} \text{ curve}$$

Such a curve approaches and reaches the target point in finite time if the target has finite area. The invention contemplates the concentrating of sound waves during only a portion of flight along such a curve, since the rate of turn required near the target becomes prohibitive, and since it is necessary that the aircraft not follow such a flight path to such an extent that crashing into the ground or target might occur. As the pilot selects a target point, he maneuvers the aircraft so that the target point may be seen through telescope 12. Then he merely must fly the aircraft so as to maintain the target within sight through the telescope. As long as flight is maintained at sonic or supersonic speed and the target point is visible through telescope 12, sound waves will be concentrated at the target. When the pilot reaches some critical point near the target, it will be necessary that he discontinue flying the particular flight path directed by the telescope.

Since sound waves emanate in all directions from the aircraft, it is not necessary at all that the spiral flight path be confined to a single plane. The aircraft travelling at sonic or supersonic speed generates a cone of sonic disturbances with the aircraft at the vertex of the cone, and by movement of handle 18, telescope 12 is maneuverable so that the sound generated in any one direction at a time may be concentrated on the target point. As movement of handle 18 rotates telescope 12 about shaft 16, all of the points toward which sound is being focused may be observed through the telescope, and hence the pilot may properly focus or concentrate the disturbances on a target point by maintaining the target within sight through the telescope by combined movement of handle 18 and maneuvering of the aircraft.

Referring to Fig. 3 there is shown an alternative embodiment of the invention which generally corresponds to the apparatus of Fig. 2 but in which the entire field of view obtainable by rotation of the telescope about the aircraft longitudinal axis or flight path is presented at one time to the pilot to eliminate the need for manual rotation of the telescope. As the eye 10 of the pilot looks through lenses 21 and 22, beam-splitter 23 and lens 24 toward the target, a ring of light defining the allowable flight paths is superimposed upon the area viewed through the telescope lenses. Light from a light source 25 which may comprise an ordinary lamp, is directed through a variable diameter reticule 26 and a projection lens 27 to beam splitter 23. The variable reticule is of the type commonly used in stadiometric aerial gunsights, and serves to project a ring of light upon beam splitter 23. Ring gear 28 of the variable reticule is driven by pinion 29 to vary the diameter of the light ring superimposed upon the scene viewed through the telescope lenses. Pinion 29 is driven by translator 20 to provide a light ring having a diameter varying in accordance with $\sqrt{M^2-1}$.

As may be seen in Fig. 4, if the desired flight path is to be defined by the diameter of a light ring, the diameter must be maintained in accordance with $2k \tan \theta$, where $k$ is a constant representing the optical distance of the light ring from the viewpoint. Since $\theta$ has been shown to equal $$\cos^{-1}\frac{1}{M}$$

it will become apparent that $2k \tan \theta$ will equal $2k\sqrt{M^2-1}$. Translator 20 may comprise any conventional non-linear translator which will provide the required function, such as a servo-mechanism employing a non-linear follow-up potentiometer, or a cam-follower arrangement suitable to modify the Mach number input quantity. Thus the output from the translator 20 will serve to determine the size of the light ring superimposed on the scene viewed through lens 24, and by maneuvering the aircraft so that the target point is maintained on the light ring, the pilot will be enabled to fly the correct path to concentrate sound disturbances at the target. While I have illustrated translators 19 and 20 in Figs. 1 and 3, as providing specific output functions, it will be realized that non-linear functions of Mach number may be provided by the aircraft machmeters computing linkages, in which case the translators would be modified to provide the same output quantities as those shown.

Since much greater speed and much sharper turning can be accomplished in pilotless aircraft, it is desirable that means be provided for practicing the invention in such aircraft. Shown in Fig. 5 is a plan view of a flight path carried out at a constant altitude to focus or concentrate sound on a target point T, which need not be at the same altitude. It will be seen that the aircraft approaches the target point T in a logarithmic spiral. In order to concentrate sound on target point T, the angle $\theta$, which is the angle between the target and a tangent to the flight path, must be maintained throughout the sound focusing period. Shown in Fig. 6 is a portion of the apparatus which may be used to guide the pilotless aircraft along the proper flight path. A homing or tracking device, which may comprise any of the conventional radio or radar homing devices used in aerial gunnery and navigation, "homes" antenna 30 upon the target and provides an output quantity such as an analogue potential commensurate in magnitude and direction with the angle between the aircraft longitudinal axis or flight path and the bearing to the target. The quantity is applied to the turning circuit of a conventional aircraft automatic steering system through resistance R–1. The output quantity from translator 19 is proportional to the desired angle $\theta$ between aircraft flight path and the target, and if the signal is applied in opposite sense through resistance R–2, it will be seen that the automatic pilot will steer the aircraft so that both input signals are equal, at which time the aircraft will be flying the desired flight path. The autopilot may include conventional additional means (not shown) to maintain the aircraft at a constant desired altitude during the course of the attack.

During flight prior to a sonic attack, the guided aircraft may be steered by control inputs to the automatic pilot applied through terminal 99 and normally-closed contact "a" of relay K–17. Such control inputs may be derived in the usual fashion such as from radio signals, punched cards, etc. When radar antenna 30 has homed on a target, output voltage may be derived from the radar range circuit inversely commensurate with range from the aircraft to the target. At a predetermined minimum range, the output voltage increases sufficiently to actuate relay K–17, which disconnects the previously applied control quantities and applies the sonic focusing flight path signals through contact "b" of relay K–17. The aircraft will then automatically fly the correct flight path so as to focus the sound on the target point. It will be seen that as the aircraft nears the target, the rate of turn required to maintain the flight path increases exponentially to a very high amount. At a predetermined maximum rate of turn, a conventional aircraft accelerometer or rate gyro actuates switch S–1, de-energizing relay K–17. De-energization of relay K–17 re-connects the automatic steering system to its previous radio or pattern-controlled input and thereby causes the aircraft to resume normal flight. Switch S–1 may be suitably damped to close slowly, so that the aircraft may fly an appreciable distance away from the target before another sonic attack is begun. A conventional aircraft accelerometer is preferably used with apparatus utilizing an automatic steering system which makes co-ordinated turns, and since acceleration normal to the flight path will increase as the aircraft spirals to near the target point, a conventional accelerometer may be arranged to open switch S–1 at a predetermined acceleration, such as the limit load factor of the aircraft. It will be apparent that photo-electric homing means may be used for night operations near populated areas instead of the radio echo-ranging means mentioned above.

While I have shown a guidance system which carries out a sonic attack at constant altitude, it will be apparent that such attacks may be made in other than horizontal planes, and furthermore, that an attack need not be confined to a single plane. Modification of my guidance system to allow attacks in other planes and in non-planar spirals will become obvious to those skilled in the art in light of this disclosure. In constructing apparatus to provide focusing of sounds generated during travel at a varying altitude, it may be considered desirable to schedule the speed of sound with altitude. For example, the function of the translators may be altered by a correction factor entered manually by the pilot, or automatically by air temperature or barometric pressure sensing means in accordance with conventional analogue computer techniques.

While I have described my invention as relating to energy disturbances created by the supersonic passage of one object through the fluid medium, it will be apparent that groups of physically separate objects may be guided together along the required path to cause even greater disturbances at target points without departing from the invention.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of concentrating energy disturbances caused by passage of an object through a fluid medium, comprising the steps of, moving an object above the critical speed of wave propagation in the general direction of a remote point, guiding said object in a spiral path so as to maintain the component of velocity toward said point of said object equal to said critical speed, and diverting said object from said spiral path as said object nears said remote point.

2. A method of concentrating sound waves generated by passage of an airborne object at supersonic speeds through the aerodynamic fluid comprising the steps of moving an aircraft at supersonic speed, guiding said aircraft in a spiral path so that the component of velocity of said aircraft toward a remote point equals the speed of sound in the aerodynamic fluid, and diverting said aircraft from said spiral path as said aircraft nears said remote point.

3. An automatic guidance system for focusing shock waves generated over a finite length of time by sonic or supersonic flight of an aircraft so as to cause said waves to arrive substantially simultaneously at a remote target comprising in combination first means for deriving a first control quantity commensurate with speed of flight, second means for deriving a second control quantity commensurate with direction of travel of said aircraft with respect to said target, means responsive to said control quantities for providing a steering control quantity commensurate with a desired direction of travel which will make the component of velocity of said aircraft toward said target substantially equal to the speed of sound, and steering means responsive to said steering control quantity for steering said aircraft.

4. Apparatus according to claim 3 in which said first means comprises means for deriving an analog computer quantity commensurate with Mach number of flight.

5. Apparatus according to claim 3 in which said second means comprises radio homing means.

6. Apparatus according to claim 3 in which said first means comprises means for deriving an analog computer quantity commensurate with Mach number of flight, said second means comprises radio homing means, means responsive to distance of said aircraft from said target for connecting said control quantities to said steering means, and means responsive to rate of turn of said aircraft for disconnecting said steering means from said control quantities.

7. A guidance system for automatically concentrating sound waves generated by supersonic flight of an aircraft at a remote target point, comprising, means for deriving a first control quantity commensurate with Mach number of flight, means for deriving a second control quantity commensurate with relative heading of said aircraft from said remote point, computing means responsive to said first control quantity for deriving a first steering control quantity commensurate with the angle whose cosine equals the reciprocal of the Mach number of flight, means for comparing said first steering control quantity and said second control quantity to provide a second steering control quantity, and steering means responsive to said second steering control quantity for steering said aircraft so as to maintain the component of velocity toward said target point of said aircraft at a value of Mach 1.

8. Apparatus as in claim 7 having means to connect said control quantities to said steering means at a predetermined distance from said point and further means operable in response to an acceleration of said aircraft to disable said steering means at a lesser distance from said point.

References Cited in the file of this patent
UNITED STATES PATENTS

| | | |
|---|---|---|
| 2,410,468 | Van Auken et al. | Nov. 5, 1946 |
| 2,576,135 | Moseley | Nov. 27, 1951 |
| 2,770,429 | Schuck et al. | Nov. 13, 1956 |